US008533666B2

(12) United States Patent
Shukla et al.

(10) Patent No.: US 8,533,666 B2
(45) Date of Patent: Sep. 10, 2013

(54) INTERACTIVE DESIGN ENVIRONMENTS TO VISUALLY MODEL, DEBUG AND EXECUTE RESOURCE ORIENTED PROGRAMS

(75) Inventors: Dharma K. Shukla, Sammamish, WA (US); Aditya G. Bhandarkar, Redmond, WA (US); Shelly Guo, Redmond, WA (US); Abhay Parasnis, Sammamish, WA (US); Ori M. Amiga, Seattle, WA (US); Raymond E. Endres, Redmond, WA (US); George M. Moore, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1101 days.

(21) Appl. No.: 12/253,545

(22) Filed: Oct. 17, 2008

(65) Prior Publication Data

US 2010/0100868 A1 Apr. 22, 2010

(51) Int. Cl.
*G06F 9/44* (2006.01)

(52) U.S. Cl.
USPC ............................ 717/109; 717/107; 717/115

(58) Field of Classification Search
None
See application file for complete search history.

(56) References Cited

U.S. PATENT DOCUMENTS

| | | | |
|---|---|---|---|
| 5,369,570 A | 11/1994 | Parad | |
| 5,564,044 A | 10/1996 | Pratt | |
| 5,640,572 A | 6/1997 | Mondrik et al. | |
| 5,826,239 A | 10/1998 | Du et al. | |
| 5,862,379 A * | 1/1999 | Rubin et al. | 717/109 |
| 5,983,265 A | 11/1999 | Martino, II | |
| 5,991,802 A | 11/1999 | Allard et al. | |
| 6,064,813 A * | 5/2000 | Sitbon et al. | 717/100 |
| 6,134,559 A | 10/2000 | Brumme et al. | |
| 6,178,546 B1 * | 1/2001 | McIntyre | 717/115 |
| 6,560,777 B2 | 5/2003 | Blackketter et al. | |
| 6,601,234 B1 * | 7/2003 | Bowman-Amuah | 717/108 |
| 6,654,950 B1 * | 11/2003 | Barnishan | 717/136 |
| 6,668,354 B1 | 12/2003 | Chen et al. | |
| 6,775,658 B1 | 8/2004 | Zothner | |
| 7,035,943 B2 * | 4/2006 | Yamane et al. | 709/248 |
| 7,171,650 B2 | 1/2007 | Fenton et al. | |
| 7,194,473 B1 | 3/2007 | Hichwa et al. | |
| 7,237,034 B2 | 6/2007 | Clarke et al. | |

(Continued)

OTHER PUBLICATIONS

"Windows Live Dev", Retrieved at <<http://dev.live.com/livedata/sdk/>>, Oct. 1, 2008, p. 1.

(Continued)

*Primary Examiner* — Tuan Q. Dam
*Assistant Examiner* — Zheng Wei
(74) *Attorney, Agent, or Firm* — Microsoft Corporation

(57) ABSTRACT

In scenarios involving a data set accessible through a protocol, operations sets may be formulated for performing various operations on the data set, and may be expressed as resource scripts according to a scripting language. However, such resource scripts may be difficult to design due to the complicated aspects of the interaction, such as asynchrony, network transport, the syntax of the scripting language, and the details of the protocol. A design environment may be devised to facilitate designers in generating resource scripts, e.g., through the manipulation of visual elements. The design environment may abstract the lower-level working details of the resource scripts, and may allow designers to focus on the logical designing of the operations set. The design environment may then automatically generate the resource script from the operations set in accordance with the constraints of the script language and the protocol.

20 Claims, 6 Drawing Sheets

(56) References Cited

U.S. PATENT DOCUMENTS

| | | | |
|---|---|---|---|
| 7,289,964 B1 | 10/2007 | Bowman-Amuah | |
| 7,313,784 B2* | 12/2007 | Hawley et al. | 717/110 |
| 7,392,509 B2* | 6/2008 | Sinha et al. | 717/126 |
| 7,441,188 B1 | 10/2008 | Russell et al. | |
| 7,444,314 B2* | 10/2008 | Rouvellou et al. | 706/47 |
| 7,555,757 B2 | 6/2009 | Smith et al. | |
| 7,562,343 B2* | 7/2009 | Hawley et al. | 717/113 |
| 7,581,212 B2* | 8/2009 | West et al. | 717/136 |
| 7,607,124 B2* | 10/2009 | Gooty et al. | 717/129 |
| 7,631,291 B2* | 12/2009 | Shukla et al. | 717/107 |
| 7,721,259 B2 | 5/2010 | Heinke et al. | |
| 7,801,896 B2 | 9/2010 | Szabo | |
| 7,831,964 B2 | 11/2010 | Nagashima et al. | |
| 7,840,647 B2 | 11/2010 | Kloba et al. | |
| 7,870,498 B2* | 1/2011 | Drummond et al. | 715/763 |
| 8,280,925 B2 | 10/2012 | Arthursson et al. | |
| 8,291,373 B2* | 10/2012 | Gibbs | 717/106 |
| 2003/0110096 A1 | 6/2003 | Dathi | |
| 2003/0163567 A1 | 8/2003 | McMorris et al. | |
| 2003/0167317 A1 | 9/2003 | Deen et al. | |
| 2003/0182463 A1 | 9/2003 | Valk | |
| 2004/0027379 A1 | 2/2004 | Hong Huey et al. | |
| 2004/0133876 A1* | 7/2004 | Sproule | 717/105 |
| 2004/0187080 A1 | 9/2004 | Brooke et al. | |
| 2004/0255046 A1 | 12/2004 | Ringseth et al. | |
| 2004/0258089 A1 | 12/2004 | Derechin et al. | |
| 2005/0044526 A1* | 2/2005 | Kooy | 717/106 |
| 2005/0060685 A1* | 3/2005 | Franz et al. | 717/109 |
| 2005/0097503 A1 | 5/2005 | Zintel et al. | |
| 2005/0114779 A1 | 5/2005 | Griesmer | |
| 2005/0120347 A1* | 6/2005 | Asare et al. | 717/177 |
| 2005/0138137 A1 | 6/2005 | Encarnacion et al. | |
| 2005/0177820 A1* | 8/2005 | Mei et al. | 717/129 |
| 2006/0070086 A1 | 3/2006 | Wang | |
| 2006/0074734 A1* | 4/2006 | Shukla et al. | 705/8 |
| 2006/0117073 A1 | 6/2006 | Bosworth et al. | |
| 2006/0150145 A1* | 7/2006 | Khandekar | 717/106 |
| 2006/0230124 A1 | 10/2006 | Belfiore et al. | |
| 2006/0288332 A1* | 12/2006 | Sagar et al. | 717/124 |
| 2007/0011672 A1 | 1/2007 | Bhide et al. | |
| 2007/0050512 A1 | 3/2007 | Chintalapati et al. | |
| 2007/0106649 A1 | 5/2007 | Moore | |
| 2007/0162899 A1* | 7/2007 | Schmidt et al. | 717/136 |
| 2007/0226024 A1 | 9/2007 | Harvey et al. | |
| 2007/0226259 A1 | 9/2007 | Kacin et al. | |
| 2007/0239499 A1* | 10/2007 | Shukla et al. | 705/7 |
| 2007/0256055 A1* | 11/2007 | Herscu | 717/115 |
| 2007/0276692 A1* | 11/2007 | Mei et al. | 705/1 |
| 2008/0155330 A1* | 6/2008 | Van Wyk et al. | 714/35 |
| 2008/0201338 A1 | 8/2008 | Castro et al. | |
| 2009/0002263 A1* | 1/2009 | Pasetto | 345/1.3 |
| 2009/0106739 A1* | 4/2009 | Weatherbee et al. | 717/127 |
| 2009/0187573 A1 | 7/2009 | Johnston et al. | |
| 2009/0249695 A1 | 10/2009 | Jain | |
| 2009/0254881 A1 | 10/2009 | Johnson et al. | |
| 2009/0292766 A1 | 11/2009 | Morris | |
| 2010/0042970 A1* | 2/2010 | Gibbs | 717/106 |
| 2011/0041171 A1* | 2/2011 | Burch et al. | 726/7 |

OTHER PUBLICATIONS

Final Office Action cited in related U.S. Appl. No. 12/250,637 dated: Apr. 6, 2012, pp. 1-12.
Response to Non Final Office Action cited in related U.S. Appl. No. 12/250,637, filed Feb. 19, 2012, pp. 1-18.
Non Final Office Action cited in related U.S. Appl. No. 12/250,637 dated: Nov. 18, 2011, pp. 1-11.
Response to Non Final Office Action cited in related U.S. Appl. No. 12/250,637, filed Oct. 11, 2011, pp. 1-20.
Final Office Action cited in related U.S. Appl. No. 12/250,637 dated: Jul. 8, 2011, pp. 1-23.
Response to Final Office Action in Related U.S. Appl. No. 12/250,637, filed Apr. 29, 2011, pp. 1-20.
Non Final Office Action cited in related U.S. Appl. No. 12/250,637 dated: Feb. 25, 2011, pp. 1-39.
Final Office Action cited in related U.S. Appl. No. 12/250,600 dated: May 3, 2012, pp. 1-50.
Response to Non Final Office Action cited in related U.S. Appl. No. 12/250,600, filed Feb. 28, 2012, pp. 1-24.
Non Final Office Action cited in U.S. Appl. No. 12/250,600 dated: Nov. 28, 2011, pp. 1-51.
Chester, Timothy M. "Cross-Platform Integration with XML and SOAP". IT Pro Published: Sep./Oct. 2001, pp. 26-34, http://ieeexplore.ieee.org/xpl/articleDetails.jsp?arnumber=952977.
Brown, Martin. "Build Perl applications with Eclipse", internet article, Published: Jan. 17, 2006 http://www.ibm.com/developerworks/opensource/tutorials/os-perlecl/section3.html13, pp. 1-5.
Tisdall, James D. "Mastering Perl for Bioinformatics", http://etutorials.org/Programming/perl+bioinformatics/Part+I+Object-Oriented+Programming+in+Perl/Chapter+3.+Object-Oriented+Programming+in+Perl/ 2003, Chapter 3, p. 72.
Wikipedia article. "Common Gateway Interface". http://web.archive.org/web/20060220020041/http://en.wikipedia.org/wiki/Common_Gateway_interface, Published: Feb. 18, 2006, pp. 1-3.
"Microsoft Dynamics AX Debugger", Retrieved at <<http://msdn.microsoft.com/en-us/library/aa569669(AX.10).aspx>>, Oct. 1, 2008, p. 1.
"Resource Builder 2.3.3", Retrieved at <<http://www.bluechillies.com/details/16235.html>>, Sep. 30, 2008, pp. 1-2.
"Tablet PC Add Support for Digital Ink to Your Windows Applications", Retrieved at <<http://msdn.microsoft.com/en-us/magazine/cc163869.aspx>>, Sep. 30, 2008, pp. 1-11.
Massoni, Joe, "An Inside Look at Developing Applications using the New Features of Visual C++ 6.0", Retrieved at <<http://www.microsoft.com/msj/1098/vc6newfeatures/vc6newfeatures.aspx>>, Oct. 1998, Sep. 30, 2008, pp. 1-11.
Valley, Scotts, "CodeGear™ Accelerates Web Development with New Version of its Visual Development Environment for PHP", Retrieved at <<http://www.codegear.com/article/37885>>, California, Apr. 14, 2008, p. 1.
"Interactive Development Environment (IDE) Enhancements", Retrieved at <<http://msdn.microsoft.com/en-us/library/aa976855(VS.71).aspx>> Oct. 1, 2008.
"PopFly Designer", Retrieved at <<http://www.popfly.com/Home.aspx>>, Oct. 1, 2008, pp. 1-3.
"Windows Workflow Foundation Designer" Retrieved at <<http://msdn.microsoft.com/en-us/library/ms441543.aspx>>, Oct. 1, 2008, pp. 1-2.
"Yahoo-Pipes", Retrieved at <<http://pipes.yahoo.com/pipes>>, Oct. 1, 2008, p. 1.
"API Test Console", Retrieved at <<http://www.google.com/base/api/demo/html/demo.html>>, Oct. 1, 2008, pp. 1-3.
"Play with the APIs", Retrieved at<<http://blog.programmableweb.com/2007/03/26/9-places-to-use-apis-without-coding/>>, Oct. 1, 2008, pp. 1-7.
"Pipes", Retrieved at <<http://pipes.yahoo.com/pipes/pipes.popular>>, Oct. 1, 2008, pp. 1-6.
"Virtual Earth Interactive SDK", Retrieved at <<http://dev.live.com/virtualearth/sdk/>>, Oct. 1, 2008, p. 1.
"Live Search Interactive SDK", Retrieved at <<http://dev.live.com/livesearch/sdk/>>, Oct. 1, 2008, p. 1.
International Search Report cited in related PCT Application No. PCY/US2009/061024 dated Jun. 7, 2010.
"International Search Report", Mailed Date: Jun. 7, 2010, Application No. PCT/US2009/061024, Filed Date: Oct. 16, 2009, pp. 11.
Notice of Allowance cited in related U.S. Appl. No. 12/250,600 Dated: Mar. 18, 2013 pp. 88.
Amendment cited in related U.S. Appl. No 12/250,600 Dated: Aug. 3, 2012 pp. 21.
Notice of Allowance cited in related U.S. Appl. No. 12/250,637 Dated: Jan. 4, 2013 pp. 20.
Amendment cited in U.S. Appl. No. 12/250,637 Dated: Nov. 19, 2012 pp. 34.
Notice of Allowance cited in related U.S. Appl. No. 12/250,637 Dated: Aug. 17, 2012 pp. 17.
Amendment cited in related U.S. Appl. No. 12/250,637 Dated: Jul. 6, 2012 pp. 22.

U.S. Appl. No. 12/250,600, filed Oct. 14, 2008, Shukla et al.
U.S. Appl. No. 12/250,637, filed Oct. 14, 2008, Shukla et al.
"Batch!" retrieved at <<http://www.snellspace.com/wp/?p=788>>, Jun. 25, 2008, pp. 6.
"Batch Processing with Google Data APIs", retrieved at <<http://code.google.com/apis/gdata/batch.html>>, Jun. 25, 2008, pp. 17.
"BeInSync Professional", retrieved at <<http://www.beinsync.com/products/professional/>>, pp. 2, Jun. 26, 2008.
Catone, Josh, "Live Mesh: First Look at Microsoft's New Platform", retrieved at <<http://www.readwriteweb.com/archives/microsoft_live_mesh_first_look.php>>, Apr. 22, 2008, pp. 4.
"DropBox", retrieved at <<http://www.getdropbox.com/>>, Jun. 26, 2008, pp. 3.
"Enforcing Business Rules with Triggers", Retrieved at <<http://msdn.microsoft.com/en-us/library/aa214450(SQL.80).aspx>>, Jun. 25, 2008, p. 1.
Mazzetti, et al., "RESTful Implementation of Geospatial Services", Retrieved at <<http://www.cosis.net/abstracts/EGU2008/05160/EGU2008-A-05160-1.pdf?PHPSESSID=>>, Geophysical Research Abstracts, vol. 10, EGU2008-A-05160, 2008, EGU General Assembly 2008.

Needleman, Rafe, "SugarSync: Most Useful Sync Tool Ever. But You'll Pay for it.", retrieved at <<http://www.webware.com/8301-1_109-9895297-2.html>>, Mar. 19, 2008, pp. 2.
"Proposal for an OpenSocial RESTful API (Draft)", retrieved at <<http://docs.google.com/View?docid=dfjqf7vg_3cwzpkw2z>>, pp. 7, Jun. 25, 2008.
Redmond, Wash. "Microsoft Acquires FolderShare, a File-Synchronization Technology Provider", retrieved at <<http://www.microsoft.com/presspass/press/2005/nov05/11-03FolderSharePR.mspx>>, Nov. 3, 2005 pp. 2.
"Son of a Batch!", retrieved at <<http://www.snellspace.com/wp/?p=885>>, Jun. 25, 2008, pp. 2.
Szepielak, Daniel, "REST-Based Service Oriented Architecture for Dynamically Integrated Information Systems", Retrieved at <<http://infolab.uvt.nl/phd-icsoc07/files/phdicsoc06szepielak.pdf>>, pp. 7-12.
First Chinese Office Action cited in Chinese Application No. 200980141549.X dated May 9, 2013, 10 pgs.

* cited by examiner

INTERACTIVE DESIGN ENVIRONMENTS TO VISUALLY MODEL, DEBUG AND EXECUTE RESOURCE ORIENTED PROGRAMS

BACKGROUND

Many computing scenarios involve a data set (such as a file system, a database, an object set, etc.) that managed by a host, and that is to be updated based on a set of operations, such as creating one or more items in the data set, reading one or more items in the data set, updating one or more items in the data set, and/or deleting one or more items in the data set (together comprising a standard set of "CRUD" operations.) Moreover, the host may be accessible through a particular protocol, such as HTTP, and the operations may correspond to a set of verbs permitted in the protocol (e.g., HTTP POST, HTTP GET, HTTP PUT, and HTTP DELETE.) An operations set may involve a series of such operations configured in a sequence to achieve a particular result (e.g., bidirectionally synchronizing a portion of a filesystem on a remote server with a locally stored version of the same portion of the filesystem.) This operations set may be performed on a device other than the host, e.g., by issuing a first operation to the host, and upon receiving notice of completion of the operation issuing a second operation, etc. The operations set may also be performed on the device as part of an application, e.g., a data-driven application that exchanges data with the host as the source of the data featured in the application.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One technique for performing an operations set against the data set managed by the host involves the use of a script language that includes data set instructions corresponding to the verbs of the protocol, as well as flow-control instructions that specify an altering of the execution flow of operations. A resource script expressed according to this script language may be executed by a script processor that can interpret the operations of the resource script to apply the corresponding protocol verbs to the data set and to alter the execution flow of the resource script based on the flow control operations. Moreover, the resource script may be expressed at design time, and when the resource script is selected (promptly or at a later date) for execution, an execution context may then be selected, such as local execution (e.g., by issuing corresponding verbs of the protocol to the host) or remote execution (e.g., by delivering the script to the host.) The execution context may therefore be selected at runtime without compromising the logical flow of operations specified therein.

However, it may be difficult to design the resource script in view of the underlying complexities of the interaction. While endeavoring to author a resource script that implements a particular logic, e.g. a domain-specific business logic, a resource script designer may have to understand and attend to many unrelated aspects arising from the configuration of the host and the interaction with the client, such as network transport, the asynchronous nature of the operations, the handling of exceptions and compensation, and the serialization of the resource script according to various wire protocols.

Some of this difficulty may be alleviated by the provision of a visual design environment for resource scripts that facilitates the selection, organization, and configuration of operations in an operations set in compliance with the script language. For example, the visual design environment may present to a designer a set of visual elements corresponding to the instructions of the script language that may be positioned (e.g., with a mouse) to indicate the ordering, properties, and interrelationships of the operations. The visual design environment may also facilitate the designing of syntactically correct resource scripts by validating the resource script and indicating operations that are incompletely or incorrectly configured. When the designing is complete and the operations set is validated, the visual design environment may also facilitate the generating of a resource script, the debugging of the resource script through tools such as breakpoints and state inspection, and the executing of the resource script in various execution contexts.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
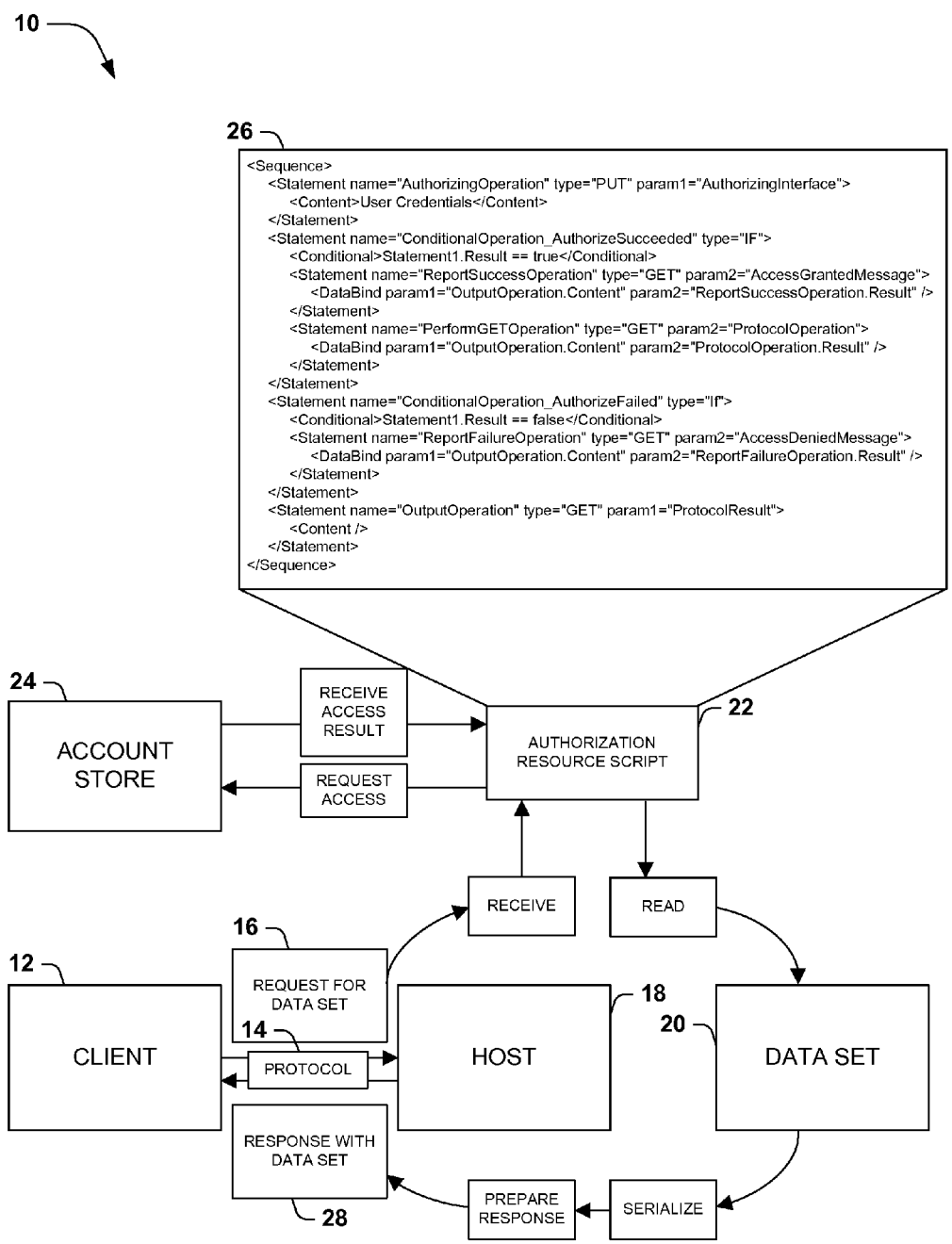
FIG. 1 is an exemplary scenario illustrating an accessing of a data set by a client through a host according to a protocol that involves a resource script.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Many computing scenarios involve a data set managed by a host, such as a filesystem hosted by a filesystem host, a database hosted by a database server, and an object set hosted by an object server. The data set may be exposed to various clients, such as devices and users, which may perform various operations on the data set. Many such scenarios include a basic set of operations for manipulating the data set, such as create, read, update, and delete operations (together referred to as a "CRUD" model for manipulating data sets.) Moreover, these operations are often combined in a particular configuration to achieve a particular task, such as synchronizing a remote filesystem on a server with a local version of the filesystem or inserting records into a database in a transactional manner.

The computing host may be configured to receive requests for performing such operations if specified according to a particular protocol. For example, the host may be configured as an HTTP endpoint (such as a webserver), and may permit interaction with the data set through a standard set of HTTP verbs. The hypertext transfer protocol was originally devised for communicating with a webserver (e.g., to request a page or resource stored on the webserver via HTTP GET) and a set of applications provided therein (such as HTTP gateway scripts, which could be accessed with parameters via HTTP POST), many servers translate HTTP requests to particular instructions for manipulating a data set (e.g., HTTP POST corresponding to a read instruction; HTTP GET corresponding to a create instruction; HTTP PUT corresponding to an update instruction; and HTTP DELETE corresponding to a delete instruction.) This configuration, sometimes referred to as a representational state transfer ("RESTful") use of a protocol, permits the server to extend access to the data set to a wide range of applications over a widely supported protocol.

Many techniques may be devised for performing an operations set on a data set accessible through a host according to a protocol. One such technique involves a scripting language featuring two types of instructions: data set instructions corresponding to the verbs of the protocol, and flow control instructions. Data set operations (those that specify data set instructions) may be processed by the host according to the corresponding verbs of the protocol (e.g., an operation comprising a read instruction may be processed by the host as an HTTP GET operation), whereas flow control operations (those that specify flow control instructions) may be evaluated and may alter the execution flow of the resource script (e.g., by repeating the performing of particular operations, by conditioning the performing of particular instructions on a predicate, and/or by jumping relocating the flow of execution to a target operation.) By expressing an operations set in a resource script having at least one data set operation and at least one flow control operation, the client may permit the host to evaluate the resource script in a comparatively lightweight script processor that processes operations pertaining to the data set according to the protocol (e.g., by passing the operations through to the components of the host that handle requests through the protocol, such as a webserver), while the flow-control instructions may be handled by the script processor. The script language may also permit instructions to be linked; e.g., a conditional operation may be predicated on the success or failure of a preceding operation. In addition, the resource script may be specified in a platform-agnostic manner, such that a choice may be made at execution time of an execution context in which the resource script may be executed. If a local execution context is selected, a local script processor may run on the client and issue protocol operations to the server; but if a host execution context is selected, the resource script may be delivered to a script processor located on the host for remote execution. While the performance of the resource script (and applications utilizing the resource script) may differ based on the execution context, the same logical sequence of operations is performed regardless of the location of the script processor.

While such resource scripts may be advantageously utilized for performing operations sets on data sets, designing such resource scripts may be difficult due to the complexity of the interactions. As a first example, a designer of a resource script may have to understand the details of the protocol, such as the types of operations that the protocol enables and the types of data consume by protocol requests and provided by protocol responses. As a second example, the designer may have to understand and account for various aspects of communication, such as establishing and utilizing communications, network transport costs such as latency, serialization and deserialization of data for transport across a network, and the graceful handling of communications interruption (such as parallel online and offline operations sets.) As a third example, the designer may have to understand and account for various aspects of the host/client relationship, such as synchronization, authentication, and statefulness of the host for both short-running and long-running resource scripts (wherein the host may suspend and store a long-running resource script for later resuming and processing.) As a fourth example, the designer may have to understand the particulars of the script language, such as the syntax of specifying instructions, the hierarchical organization of the operations in the resource script, and the correlation of particular instructions of the script language with the verbs of the protocol. These and other complexities may considerably complicate the efforts of a designer to author a resource script for a particular feature, and such complexities may have little relation with the nature and logic of the domain-specific operations that the designer wishes to implement.

FIG. 1 illustrates an exemplary scenario 10 involving an accessing by a client 12 of a data set 20 accessed through a host 18 according to a protocol 14 and involving the use of a resource script 22. The client 12 in this scenario 10 endeavors to read the data set 20, and so issues a protocol request 16 to the host 18 including an HTTP GET verb and specifying the data set 20. The host 18 provides access to the data set 20 through the protocol 14 (e.g., through a configuration as a webserver providing a RESTful interface to the data set 20), and may send the client a protocol response 28 that includes the requested data set 20. However, the data set 20 is restricted to particular user accounts identified in an account store 24, and the host 18 is tasked with authenticating a set of credentials (such as a username and password) provided by the client 12 before permitting a fulfilling of the protocol request 16 by reading the data set 20. In performing this task, the host 18 utilizes a resource script 22 that passes the authentication credentials to the account store 24, responds to a successful authentication with an "Access Granted" message and a reading of the data set 20, and responds to a failed authentication with an "Access Denied" message. A designer may author such a resource script 22 in many scenarios utilizing the data set 20, such as reading the data set 20 for use in a data-driven application executing on the client 12.

The pseudocode block 26 of FIG. 1 illustrates the contents of a resource script 22 that may be utilized to interact with the account store 24 during the fulfilling of the protocol request 16. It may be appreciated that the pseudocode block 26 exhibits but one formulation of a resource script 22 formatted according to one script language that may be utilized in this capacity, and that many other resource scripts in this and other script languages may be available.

However, the resource script 22 expressed in the pseudocode block 26 of FIG. 1 presents some advantages with respect to other resource scripts and other script languages. As a first example, the resource script is declaratively specified, comprising a set of elements that together describe the process in performing the authentication operation. In contrast with resource scripts expressed in script languages designed according to other programming paradigms, such as imperative programming paradigms, procedural programming paradigms, and object- and aspect-oriented programming paradigms, the declarative structure of the pseudocode block 26 may be more easily human-readable and more easily parsed by a parser due to the regular structure, such as may be conferred by a hierarchically organized document object model. As a second example, the resource script presented in the pseudocode block 26 of FIG. 1 is expressed in a script language that is based on the protocol 14, which enables platform-independent execution, and in particular a runtime-selectable execution context. For example, the resource script 22 may be designed and stored in a manner independent of the hardware or software architecture of the system on which the resource script 22 may be executed. At runtime, an execution context for the resource script 22 may be specified, and the resource script 22 may be executed in many runtime-specified execution contexts without platform-specific reconfiguration and with an equivalent effect on the data set 20. As a third example, the regular structure and comparatively simple structure of the script language of this pseudocode block 26 (as contrasted with the more complex structure of programming languages such as Java and C++) enables a comparatively lightweight design for a script processor, which may execute data set operations by passing them through to the protocol 14 (e.g., for handling by the webserver components of the host 18), and may execute flow control operations by altering a flow of execution of the resource script. Nevertheless, higher-level features may still be offered within the comparatively simple script language, such as failure compensation (through the use of flow-control operations) and data binding (through the use of instructions for associating a property of an operation with a property of another operation, or with an aspect of the client 12, the host 18, the data set 20, the protocol request 16 or the protocol response 28.)

However, it may also be appreciated that the pseudocode block 26 of FIG. 1 may be difficult for a designer to author without assistance. Successfully expressing a resource script in the script language illustrated in this pseudocode block 26 without assistance involves a detailed knowledge of many aspects of the interaction of FIG. 1. For example, the designer may have to understand the hierarchical structure of the declaratively specified resource script 22; the syntax of the script language and of the declaratively specified resource script 22 (such as the definitions of various parameters and the enclosure of elements such as "Conditional" and "DataBind"); the details of the underlying HTTP GET protocol request 16, and the correlation of instructions of the script language with the verbs of the protocol (such as the manner of executing an HTTP GET operation in the resource script 22 through the use of a GET-type statement in the script language); the nature of the user credentials provided with the protocol request 16, and the manner of providing the user credentials to the account store 24 and interpreting the result; the use of data-binding features to relate various properties of the operations in order to achieve the desired result of the resource script 22; and the network transport costs (such as lag) incurred by the resource script 22 upon issuing the protocol request 16 over a network. Designing a resource script 22 that correctly respects all of these concepts, while also fulfilling the syntactic constraints of the script language, may be very difficult even for a skilled designer. Moreover, all of these complex details may be unrelated to the interests of the designer developing the resource script 18 in order to read the data set 20 in furtherance of a data-driven application on the client 12.

A design environment may be devised to facilitate the creation of resource scripts that alleviates some of the complexity arising from the interactions specified therein. The design environment may present to a designer the set of instructions in the script language, and may assist the designer in choosing and arranging such instructions as operations of the operations set. As one example, the design environment may be presented in a partially graphical manner that permits designers to manipulate the instructions through a windowing interface, such as by dragging-and-dropping instructions through keyboard and mouse gestures to select, organize, and associate the operations of the operations set. A design environment of this nature (sometimes referred to as a "visual" design environment) may facilitate the design of an operations set that obscures the working details of the resource script (such as the syntax of the script language, the details of the protocol, and network parameters such as connection establishing and asynchrony), and that allows the designer to focus on the logical configuration of the operations in the resource script. In addition, the design environment may facilitate the generating of an operations expressing the operations set specified by the designer, and in particular may automatically generate operations in the resource script that comply with the syntactic and logical constraints of the script language.

Figure 2:
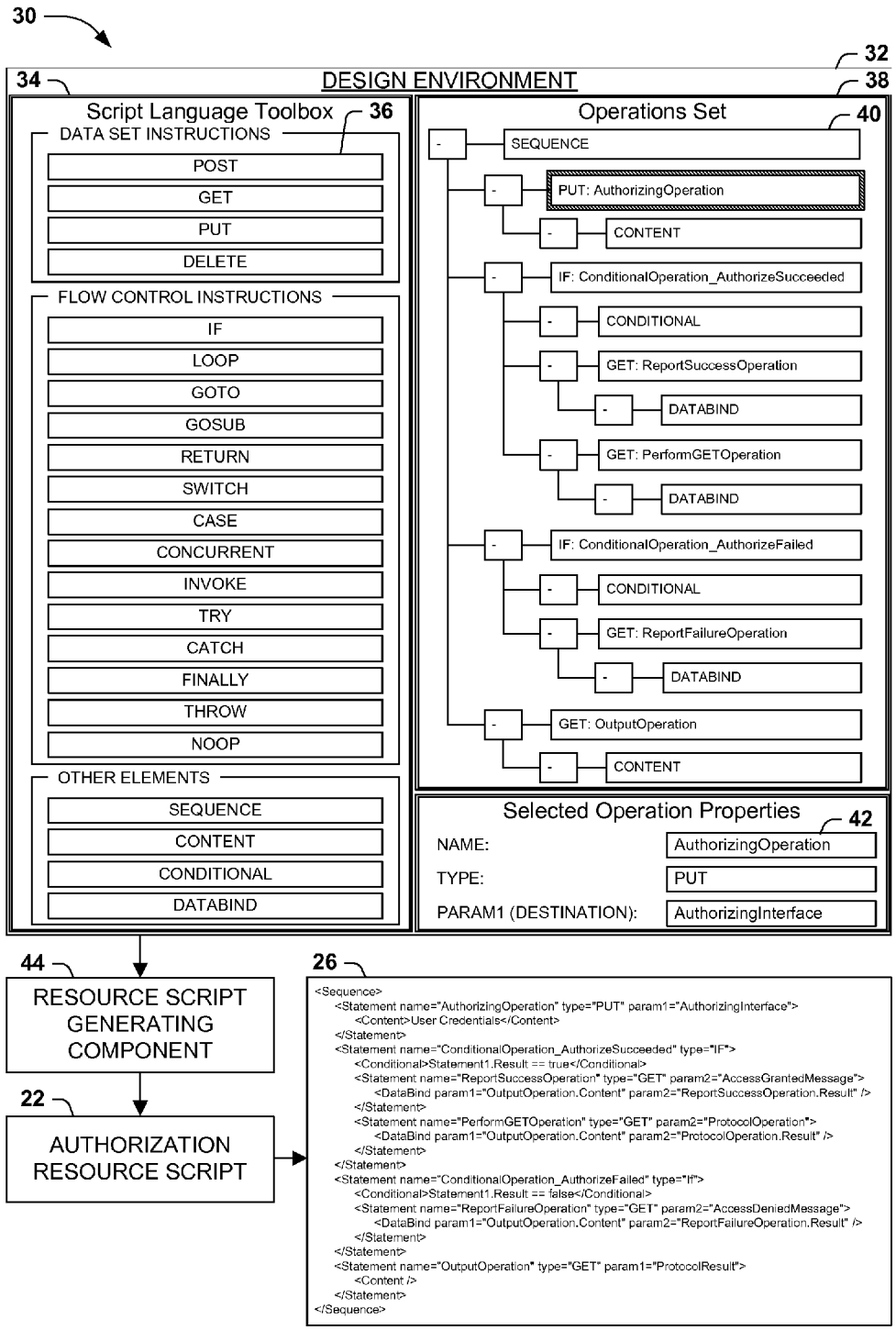
FIG. 2 is an illustration of an exemplary design environment configured to generate a resource script applicable to a data set accessible according to a protocol.

FIG. 2 illustrates an exemplary scenario 30 featuring a design environment 32 that is presented in a visual manner, and that a designer may use to specify the operations set 38 and generate the resource script 22 comprising the operations specified in the pseudocode block 26. The design environment 32 is configured to display the elements 36 comprising the script language (e.g., in a script language toolbox 34) and the operations 40 comprising the operations set 38. The design environment 32 may display the operations set 38, e.g., as a hierarchical tree of nested nodes that represent the structure and relationships of the operations 40 of the operations set 38. The design environment 32 may also allow a designer to construct and configure the operations set 38 by providing input to the design environment 32. For example, the design environment 32 may allow a user to add an operation 40 to the operations set 38 by double-clicking an element 36 in the script language toolbox 34, or by dragging-and-dropping an element 36 into a particular position in the operations set 38. As another example, the design environment 32 may allow a user to configure an operation 40 by selecting the operation 40 (e.g., by clicking on the operation 40 with a mouse), and may display at least one property 42 of the selected operation 40 (such as the values assigned to the operation 40 for an operation name, the type of operation, and the parameters used to execute the operation.) Finally, the visual designer 32 may permit a designer to generate a resource script 22 from the operations set 38 (the latter comprising the logically organized and configured operations 40, and the former comprising an expression of the operations set 38 according to the script language, such as illustrated in the pseudocode block 26.) Upon receiving a request to generate the resource script 22, the design environment 32 may invoke a resource script generating component 44 to generate the operations of the resource script 22 according to the script language. In this manner, the design environment 32 may significantly facilitate a designer in generating resource scripts 22 that conform to the script language, while automatically handling the complex working details of the resource script 22 that may not be of interest to the designer.

Figure 3:
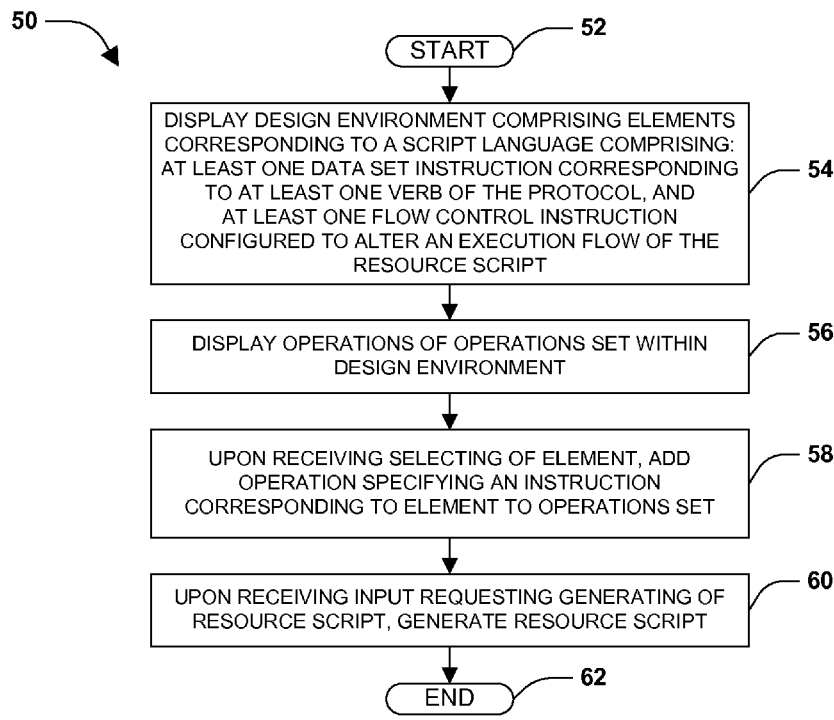
FIG. 3 is a flow chart illustrating an exemplary method of generating a resource script applicable to a data set accessible according to a protocol.

FIG. 3 presents a first embodiment of the techniques discussed herein and illustrated in FIG. 2, comprising an exemplary method 50 of generating a resource script 22 applicable to a data set 20 accessible according to a protocol 14. The exemplary method 50 begins at 52 and involves displaying 54 a design environment 32 comprising elements 36 corresponding to a script language, which may in turn comprise at least one data set instruction corresponding to at least one verb of the protocol 14, and at least one flow control instruction configured to alter an execution flow of the resource script 22. The exemplary method 50 also involves displaying 56 the operations 40 of the operations set 38 within the design environment 32. The exemplary method 50 also involves, upon receiving input selecting an element 36, adding 58 an operation 40 specifying an instruction corresponding to the element 36 to the operations set 38. The exemplary method 50 also involves, upon receiving input requesting generating of the resource script 22, generating 60 the resource script 22. Having provided a design environment 32 that accepts input to add operations 40 corresponding to the instructions of the script language to the operations set 38, and having generated the resource script 22 from the operations set 38 in accordance with the script language, the exemplary method 50 achieves the facilitating of the designer in generating the resource script 22, and so ends at 62.

Figure 4:
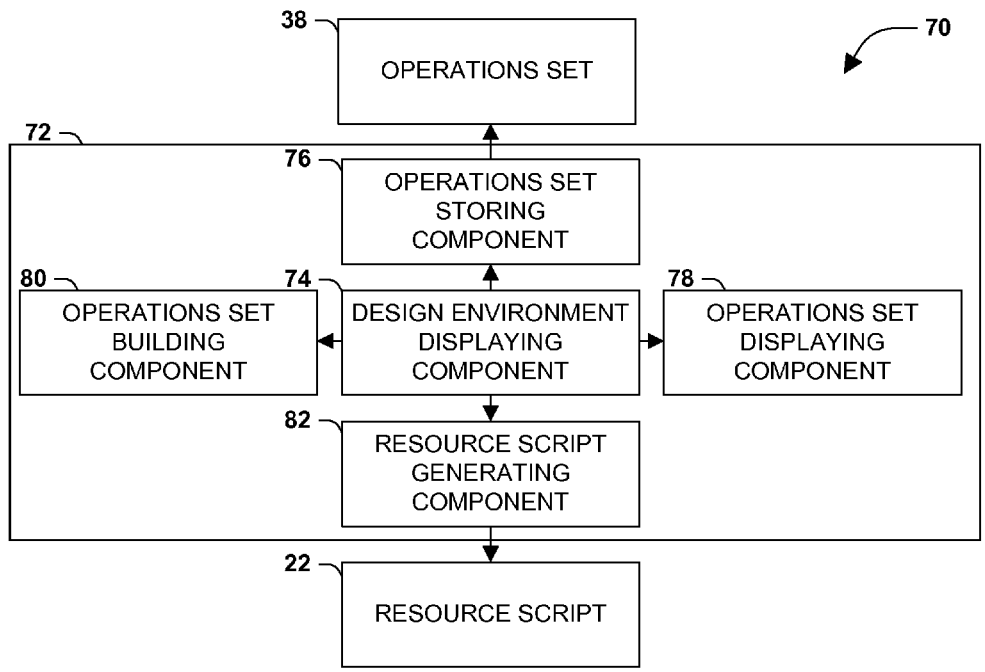
FIG. 4 is a component block diagram illustrating an exemplary system for generating a resource script applicable to a data set accessible according to a protocol.

FIG. 4 presents a scenario 70 illustrating a second embodiment of the techniques discussed herein and illustrated in FIG. 2, comprising an exemplary system 72 for generating a resource script 22 applicable to a data set 22 accessible through a host 20 according to a protocol 14. The exemplary system 72 includes a design environment displaying component 74, which is configured to display a design environment 32 comprising elements 36 corresponding to a script language, which may in turn comprise at least one data set instruction corresponding to at least one verb of the protocol 14 and at least one flow control instruction configured to alter an execution flow of the resource script 22. The exemplary system 72 also includes an operations set displaying component 78, which is configured to display the operations of an operations set 38 within the design environment 32. The exemplary system 72 also includes an operations set building component 80, which is configured, upon receiving a selection of at least one element 36 in the design environment 32, to add an instruction corresponding to the element 36 to the operations set 38. The exemplary system 72 also includes an operations set storing component 76, which is configured to store the operations set 38. The exemplary system 72 also includes a resource script generating component 82, which is configured, upon receiving a request to generate the resource script 22, to generate the resource script 22. The components of the exemplary system 72 thereby cooperate to achieve the presenting to the designer of a design environment 32 that may facilitate the organization and configuration of operations 40 in the operations set 38 and the generating of a resource script 22 that expresses the operations set 38 in compliance with the constraints of the script language.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 50 of FIG. 3 and the exemplary system 72 of FIG. 4) to confer individual and/or synergistic advantages upon such embodiments.

A first aspect that may vary among embodiments of these techniques involves the scenarios in which the techniques may be applied. As a first example, the resource script 22 may be prepared for application to a data set 20 comprising a resource in a deployable computing environment. This scenario may be devised to address the increasingly large and diverse set of objects managed by a set of object systems. For example, a computing environment may comprise a set of files managed by a file system, one or more databases managed by a database system, a set of executable binaries representing applications and managed by an assembly cache, a set of user profiles managed by a user profile component of an operating system, and various data caches managed by data caching components, such as a set of copied items managed by a copy buffer of the operating system, a set of undo actions managed by an undo component of the operating system, and a set of "most recently used" items managed by an item usage tracking component of the operating system. Moreover, such objects may be exchanged among a plurality of devices operated by one or more users, and according to one or more operations (e.g., an object synchronization operation that merges two object sets and an object mirroring operation that adjusts a target object set to match a source object set.) In this manner, the objects are loosely organized through a set of object systems and aggregated to represent the computing environment.

In order to reduce the complex variety and decentralization of the objects comprising a contemporary computing environment, a deployable representation of the computing environment may be devised, where the objects comprising the computing environment are organized in an object hierarchy, which may be hosted by a computing environment host. If the objects are represented in a uniform manner and managed in a consistent way by an object system, a set of services may be devised to apply to all of the objects of the computing environment. Moreover, the object hierarchy may be delivered to various devices to represent the same computing environment (including the same user profiles, applications, data files, etc.), and each device may render the computing environment in a consistent manner but customized based on the capabilities of the device (e.g., a hard keyboard interface for receiving data entry from a keyboard device attached to a workstation, and a touchscreen software keyboard interface for receiving data entry from a cellphone device.) With relation to the concept of a deployable computing environment, it may be advantageous to configure at least one server to manage one or more data objects within the representation, and to operate as a host that accepts access requests to such resources through a protocol (such as RESTful interactions over HTTP.) In accordance with these techniques, the resource script 22 may be configured as an operation applying to a resource in the deployable computing environment, which may be accessed through a computing environment host according to the verbs of a protocol through which the host provides access to the resource. However, those of ordinary skill in the art may devise many such scenarios in which the techniques discussed herein may be applied.

As a second exemplary scenario in which these techniques may be applied, the development environment 32 may be designed to interface with the designer in many contexts. As a first example, the design environment 32 may comprise an application executing on a device, such as an integrated development environment on a computer. In this example, the design environment 32 may be displayed on the device hosted on the design environment 32. As a second example, the design environment may comprise a web-deployed application, which may be hosted on an application host and may be partially or wholly loaded into a browser for execution. In this example, the design environment 32 may be hosted on the application host but displayed within a browser. The browser may be also configured to load and execute some or all of the capabilities of the design environment 32, such as storing the resource script and generating the operations set. Conversely, the application host may provide some or all of the capabilities of the design environment 32; e.g., the browser may operate as a thin-client interface to the web application executing on the application host. Those of ordinary skill in the art may devise many architectures for the design environment 32, and may choose many platforms on which part or all of the design environment 32 may operate and interface with the designer, while implementing the techniques discussed herein.

A second aspect that may vary among embodiments of these techniques relates to the presentation of the design environment 32 and the actions that a designer may perform within the design environment 32. While it may be possible to presenting the design environment 32 as a text-based design environment, such as a text editor, significant advantages may be achieved by presenting the design environment 32 in a partially graphical manner, wherein items in the design environment 32 may be manipulated by a designer as controls in a windowing interface, such as by dragging-and-dropping instructions through keyboard and mouse gestures to select, organize, and associate the operations 40 of the operations set 38. This "visual" layout of a design environment 32 may significantly reduce the amount of input involved in performing basic operations (e.g., adding an operation 40 to an operations set 38 in a text editor may involve sixty keystrokes, but may only involve a drag-and-drop operation in a visually oriented design environment 32) and the errors associated with data entry, thereby providing a significant convenience and an improved experience to the designer while accelerating the development of the operations set 38.

Figure 5:
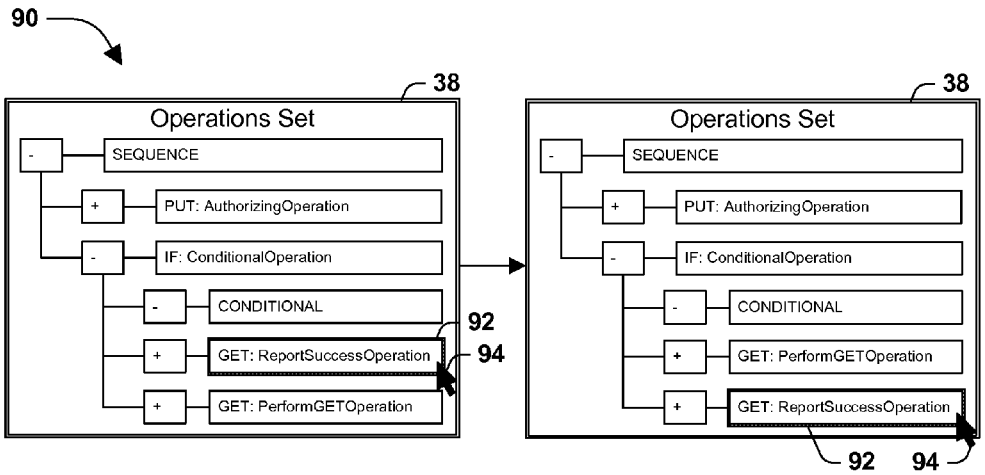
FIG. 5 is an illustration of an exemplary scenario involving a reordering of an operation in an operations set within a design environment in response to input.

In furtherance of a visually oriented design environment 32, a first example of this second aspect may involve receiving input (e.g., from a designer) indicating a relocating of an operation in the operations set to a destination location, and responding by relocating the operation in the operations set. FIG. 5 illustrates an exemplary scenario 90 wherein a user first selects an operation 92 with a pointer 94 (which may be controlled by a pointing device, such as a mouse, a touchpad, or a touchscreen interface), and then drags the selected operation 92 downward to relocate the selected operation 92 to a later position in the sequence of the operations set 38. The development environment 32 may respond by relocating the selected operation 92 in the ordering of the operations set 38, as displayed within the design environment 32. As a second example, upon receiving input selecting an operation 92 in the operations set 38 (e.g., by clicking on the operation 92 with a pointer 94), the design environment 32 may respond by displaying at least one property of the operation 92. Additionally, upon receiving input configuring at least one property of the operation 94, the design environment 32 may respond by configuring the at least one property of the operation 94 according to the input. Some examples of this manner of configuring an operation 94 involve data-binding a property of the operation 94 to a data source, such that the property of the operation 94 is unidirectionally or bidirectionally synchronized with the data source. For example, at least one data set instruction may comprise a request property relating to a request to apply the verb of the protocol 14 to the data set 20 (e.g., an aspect of the protocol request 16), and a response property relating to a response generated by applying the verb to the data set 20 (e.g., an aspect of the protocol response 28.) Data-binding such properties may enable the operations set 38 to perform operations on the protocol request 16 and/or the protocol response 28, and such data binding may be formed in response to input within the design environment 32.

Figure 6:
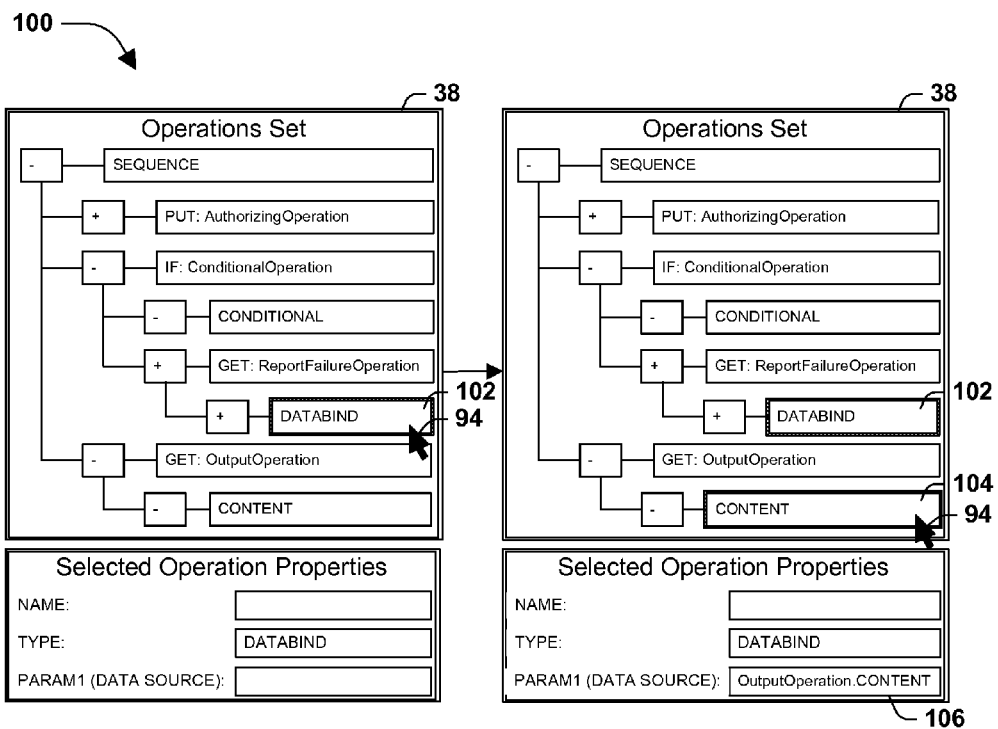
FIG. 6 is an illustration of an exemplary scenario involving a data binding of a property of a first operation to a property of a second operation in an operations set within a design environment in response to input.

FIG. 6 illustrates one such example, wherein a first operation 102 in an operations set 38 has been selected by a pointer 94. The design environment 32 may display properties for the first operation 102, such as its name, type, and parameters used in execution. The user may configure the data source property of this data binding operation by selecting a property of a second operation 104, such as a CONTENT property of a GET operation. The design environment 32 may respond to such input by configuring the property of the first operation 102 to data-bind to the property of the second operation 104. Alternatively or additionally, the design environment 32 may receive input from a user representing a data binding of a property of an operation 40 to an aspect of a client 12 executing the resource script 22, such as an aspect of a data-driven application running on the client 12. The design environment 32 may respond by configuring the property of the operation 40 to data-bind to the aspect of the client 12. Those of ordinary skill in the art may devise many capabilities of design environments 32 (particularly visually-oriented design environments 32) configured according to the techniques discussed herein.

Figure 7:
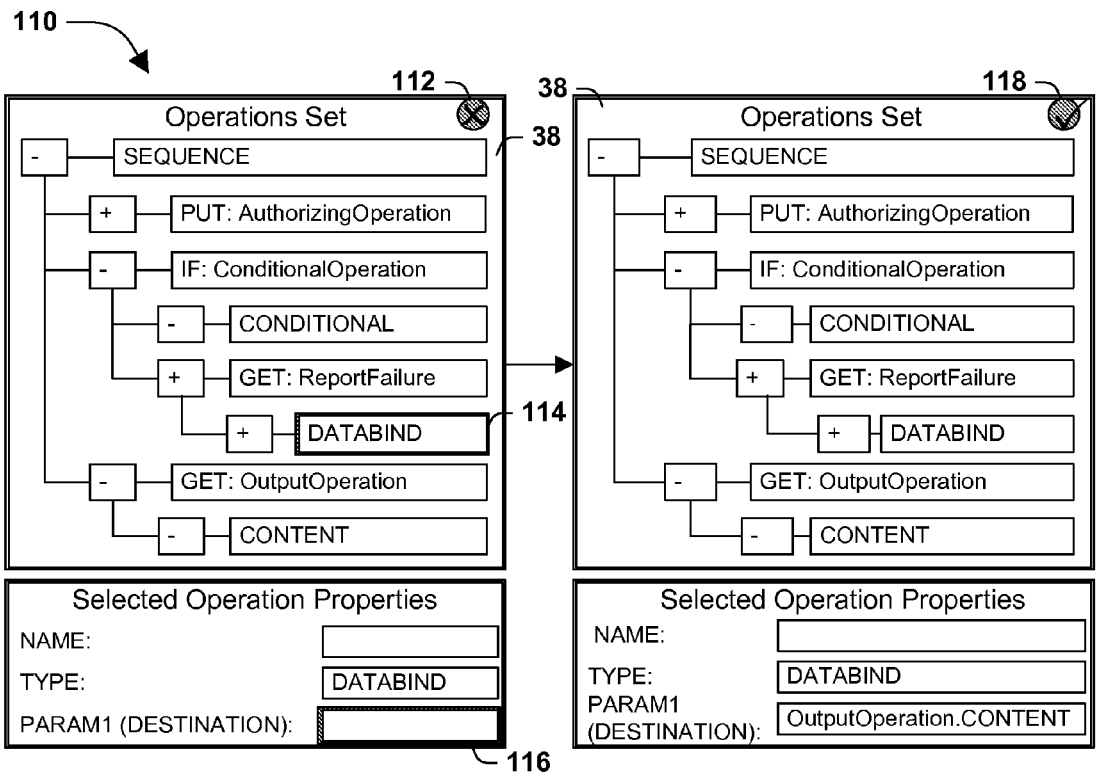
FIG. 7 is an illustration of an exemplary scenario involving a validating of an operations set within a design environment.

A third aspect that may vary among embodiments of these techniques relates ton operations set validating feature of the design environment 32, whereby the operations set 38 may be reviewed at design time to indicate whether the operations set 38 is valid or invalid according to the script language, and whether or not a resource script 22 may be generated therefrom. As a user builds and configures the operations 40 of the operations set 38, the design environment 32 may (periodically, continuously, or upon request) monitor the validity of the operation set 38, such as the validity of data-bound properties of operations 40 and the complete or incomplete configuration of the operations 40. FIG. 7 illustrates an exemplary scenario 110 wherein a design environment validates an operations set 38 at design time. In this exemplary scenario, one particular operation comprises an invalid operation (a "DATABIND" operation having an unspecified data source.) In this and other embodiments, upon failing to validate at least one invalid operation of the operations set 112, the design environment 32 may display an invalid operation indicator 114 for the invalid operations of the operations set 38. This invalid operation indicator 114 may draw the attention of the designer to the invalid operations that are to be corrected before the operations set 38 may be expressed as a resource script 22. Additional indicators may also be displayed within the design environment 32, such as an invalid operations set indicator 112 indicating that the resource script 38 is not yet valid and cannot be expressed, and an invalid operation property indicator 116 indicating the property of an invalid instruction that is invalidly configured (e.g., the "DESTINATION" parameter of the invalid "DATABIND" instruction.) Alternatively, if the design environment 32 validates the operations set 38, the design environment 32 may display a valid operations set indicator 118, denoting that the operations set 38 is valid according to the script language and may be expressed as a resource script 22. Those of ordinary skill in the art may devise many operations set validation features in design environments 32 developed in accordance with the techniques discussed herein.

A fourth aspect that may vary among embodiments of these techniques relates to the generating of a resource script 22 from an operations set 38 according to the script language. The generating may be performed on demand at design-time, and may present the user with a resource script 22 specified in the script language (e.g., the pseudocode block 26 of FIGS. 1 and 2.) In some embodiments, the generating may also be performed in accordance with a wire protocol, such as JSON, Atom, or RSS. It may be desirable to generate the resource script 22 according to a wire protocol that is supported by a particular host 18 on which the resource script 22 may be executed, and may confer advantages on the processing of the resource script 22, such as well-known formatting and serialization processes. Thus, in some embodiments, the design environment 32 may receive input requesting generating of the resource script 22 according to a wire protocol, and may respond by generating the resource script 32 according to the wire protocol. Those of ordinary skill in the art may devise many ways of generating a resource script 22 from an operations set 38 in accordance with the techniques discussed herein.

A fifth aspect that may vary among embodiments of these techniques relates to an executing of a resource script 22 and the participation of the design environment 32 therein. Where the resource script 22 is expressed in a script language that is platform-agnostic, a choice may be made at execution time of an execution context in which the resource script 22 may be executed. If a local execution context is selected, a local script processor may run on the client 12 and issue protocol operations to the host 18; but if a host execution context is selected, the resource script 22 may be delivered to a script processor located on the host 18 for remote execution. While the performance of the resource script 22 (and applications utilizing the resource script 22) may differ based on the execution context, the same logical sequence of operations is performed on the data set 20 regardless of the location of the script processor, resulting in an equivalent effect of the executing of the resource script 22 on the data set 20.

In view of the flexible execution contexts of a resource script 22, the design environment 32 may enable a designer to execute the resource script 22 in a particular execution context. For example, upon receiving input requesting execution of the resource script 22, the design environment 32 may present at least two execution contexts, and may await a choice by the designer. Upon receiving input choosing a selected execution context, the design environment 32 may execute the resource script 22 on a script processor according to the selected execution context. For example, where the input denotes the choice of a host execution context, the design environment 32 may execute the resource script 22 by sending the resource script 22 to a script processor on the host 18. More particularly, the host may be configured to receive resource scripts 22 formatted (e.g., serialized) according to one or more wire protocols, such as JSON, Atom, and RSS. The design environment 32 may therefore execute the resource script 22 in the host execution context by selecting a wire protocol supported by the host 18, serializing the resource script 22 according to the wire protocol, and sending the resource script 22 serialized according to the wire protocol to a script processor on the host 18. Alternatively, where the input denotes a choice of a local execution context, the design environment 32 may execute the resource script 22 on a local script processor, which may be configured to process data set operations by issuing the corresponding verb of the protocol 14 to a host 18 through which the data set 20 is accessible, and to process flow control operations by altering an execution flow of the resource script 22 (e.g., by altering an instruction pointer to indicate a particular operation 40 to be executed next.)

A particular scenario where executing the resource script 22 on in a local execution context may be advantageous involves debugging of the resource script 22, wherein a designer may wish to monitor some aspects of the resource script 22 during execution (e.g., the flow of execution through the resource script 22, the properties of various operations 40, or the interaction with the host 18 and/or the data set 20.) Executing the resource script 22 in a local execution context may facilitate such monitoring as compared with a host execution context, since the host 18 may not be properly configured for debugging or may not permit debugging techniques.

Figure 8:
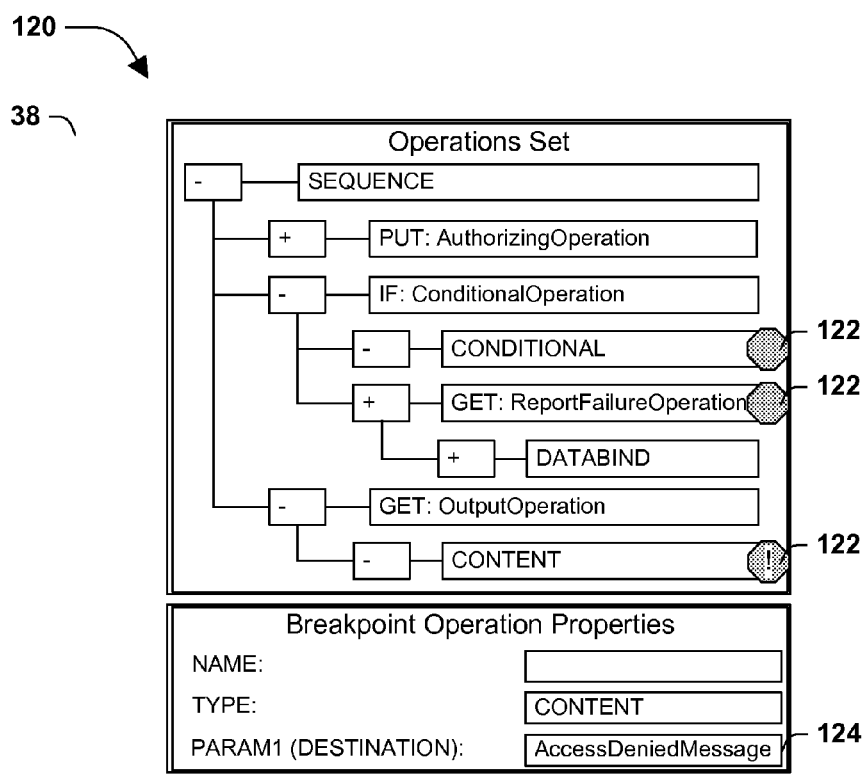
FIG. 8 is an illustration of an exemplary scenario involving a debugging of an executing operations set within a design environment featuring breakpoints and inspection of a property of an operation.

The design environment 32 may offer many debugging techniques that may be utilized while a resource script 22 is executing in a local execution context. FIG. 8 illustrates an exemplary scenario 120 featuring some debugging techniques that may be applied to an executing operations set 38. As a first example, the design environment 32 may permit the use of breakpoints that stop execution of the operations set 22 at a particular point of interest. For example, upon receiving input representing a setting of a breakpoint at an operation 40, the design environment 32 may associate a breakpoint with the operation 40. FIG. 8 illustrates some breakpoints 122 associated with particular operations 40 of the operations set 38. If the design environment 32 detects an executing of an operation 40 of a resource script 22 associated with the breakpoint, the design environment 32 may break the executing of the resource script 22. The design environment may also display for the designer the operation 40 of the operations set 38 corresponding to the operation 40 of the resource script 22 associated with the encountered breakpoint 122. Moreover, upon receiving input requesting a resuming of the executing of the resource script 22, the design environment 32 may resume the executing of the resource script 22. A related debugging technique that may be applied to an executing resource script 22 involves the inspecting of various properties of the resource script 38, either during the executing of the resource script 38 or when the execution of the resource script 38 has been broken at a breakpoint 122. In these scenarios, and as illustrated in FIG. 8, the design environment 32 may receive input representing a selecting of a property of an executing resource script 22 (such as a property of an operation 40, e.g., the operation 40 associated with the encountered breakpoint 122.) The design environment 32 may respond by displaying the property of the executing resource script 32, thereby permitting the designer to inspect various aspects of the executing resource script 32. Those of ordinary skill in the art may include many debugging techniques that may be applied to execution scripts within design environment implemented according to the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
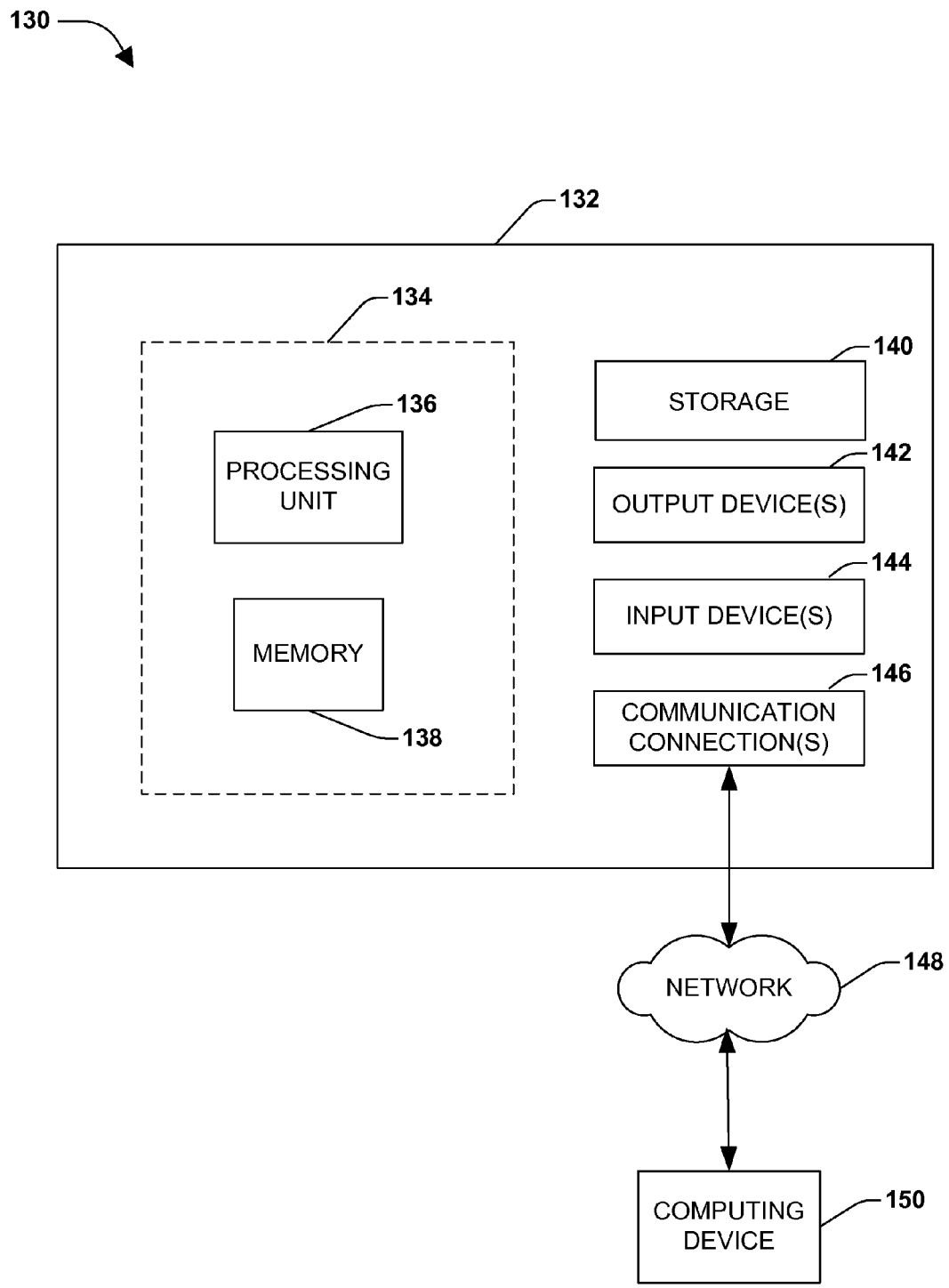
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 130 comprising a computing device 132 configured to implement one or more embodiments provided herein. In one configuration, computing device 132 includes at least one processing unit 136 and memory 138. Depending on the exact configuration and type of computing device, memory 138 may be volatile (such as RAM, for example), non-volatile (such as ROM, flash memory, etc., for example) or some combination of the two. This configuration is illustrated in FIG. 9 by dashed line 134.

In other embodiments, device 132 may include additional features and/or functionality. For example, device 132 may also include additional storage (e.g., removable and/or non-removable) including, but not limited to, magnetic storage, optical storage, and the like. Such additional storage is illustrated in FIG. 9 by storage 140. In one embodiment, computer readable instructions to implement one or more embodiments provided herein may be in storage 140. Storage 140 may also store other computer readable instructions to implement an operating system, an application program, and the like. Computer readable instructions may be loaded in memory 138 for execution by processing unit 136, for example.

The term "computer readable media" as used herein includes computer storage media. Computer storage media includes volatile and nonvolatile, removable and non-removable media implemented in any method or technology for storage of information such as computer readable instructions or other data. Memory 138 and storage 140 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 132. Any such computer storage media may be part of device 132.

Device 132 may also include communication connection(s) 146 that allows device 132 to communicate with other devices. Communication connection(s) 146 may include, but is not limited to, a modem, a Network Interface Card (NIC), an integrated network interface, a radio frequency transmitter/receiver, an infrared port, a USB connection, or other interfaces for connecting computing device 132 to other computing devices. Communication connection(s) 146 may include a wired connection or a wireless connection. Communication connection(s) 146 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 132 may include input device(s) 144 such as keyboard, mouse, pen, voice input device, touch input device, infrared cameras, video input devices, and/or any other input device. Output device(s) 142 such as one or more displays, speakers, printers, and/or any other output device may also be included in device 132. Input device(s) 144 and output device(s) 142 may be connected to device 132 via a wired connection, wireless connection, or any combination thereof. In one embodiment, an input device or an output device from another computing device may be used as input device(s) 144 or output device(s) 142 for computing device 132.

Components of computing device 132 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 132 may be interconnected by a network. For example, memory 138 may be comprised of multiple physical memory units located in different physical locations interconnected by a network.

Those skilled in the art will realize that storage devices utilized to store computer readable instructions may be distributed across a network. For example, a computing device 150 accessible via network 148 may store computer readable instructions to implement one or more embodiments provided herein. Computing device 132 may access computing device 150 and download a part or all of the computer readable instructions for execution. Alternatively, computing device 132 may download pieces of the computer readable instructions, as needed, or some instructions may be executed at computing device 132 and some at computing device 150.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

It may be appreciated that a resource script may comprise a resource script.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of generating a resource script applicable to a data set, the method comprising:
   displaying a design environment comprising elements respectively corresponding to an operation within an operations set of a script language, the operations set comprising:
      at least one data set instruction affecting the data set, and
      at least one flow control instruction configured to alter an execution flow of the resource script;
   upon receiving input selecting an element, adding to the operations set the operation corresponding to the selected element; and
   upon receiving input requesting generating of the resource script for execution by a host:
      among at least two wire protocols, selecting a wire protocol that is supported by the host; and
      generating the resource script specifying respective operations of the operations set according to a verb of the wire protocol supported by the host.

2. The method of claim 1, the data set comprising at least one resource represented in a deployable computing environment hosted by the host.

3. The method of claim 1, the displaying comprising at least one of:
   displaying within a browser a design environment hosted on an application host, and
   displaying on a device a design environment hosted on the device.

4. The method of claim 1, further comprising: upon receiving input relocating an operation in the operations set to a destination location, relocating the operation in the operations set.

5. The method of claim 1, further comprising:
   upon receiving input selecting an operation in the operations set, displaying at least one property of the operation; and
   upon receiving input configuring at least one property of the operation, configuring the at least one property of the operation.

6. The method of claim 5,
   the properties of at least one operation comprising:
      a request property relating to a request to apply the verb of the protocol to the data set, and
      a response property relating to a response generated by applying the verb of the wire protocol to the data set.

7. The method of claim 5, further comprising: upon receiving input data-binding a property of a first operation to a property of a second operation, configuring the property of the first operation to data-bind to the property of the second operation.

8. The method of claim 5, comprising: upon receiving input data-binding a property of an operation to an aspect of the host, configuring the property of the operation to data-bind to the aspect of the host.

9. The method of claim 1, further comprising: validating the operations of the operations set according to the script language.

10. The method of claim 9, further comprising:
    upon validating the operations of the operations set, displaying a valid operations set indicator within the design environment; and
    upon failing to validate at least one invalid operation of the operations set, displaying an invalid operation indicator for the at least one invalid operation of the operations set within the design environment.

11. The method of claim 1, further comprising:
    upon receiving input requesting execution of the resource script, presenting at least two execution contexts; and
    upon receiving input choosing a selected execution context, executing the resource script on a script processor according to the selected execution context.

12. The method of claim 11:
    the data set accessible through a remote host according to the protocol;
    the selected execution context comprising a local execution context; and
    the executing comprising: executing the resource script on a local script processor configured to:
       for respective data set operations, issue the corresponding verb of the protocol to the remote host, and
       for respective flow control operations, alter an execution flow of the resource script.

13. The method of claim 12, further comprising:
upon receiving input setting a breakpoint at an operation, associating a breakpoint with the operation;
upon executing the operation associated with the breakpoint:
breaking the executing of the resource script, and
upon receiving input requesting resuming the executing of the resource script, resuming the executing of the resource script.

14. The method of claim 13, further comprising: upon receiving input selecting a property of an executing resource script, displaying the property of the executing resource script within the design environment.

15. The method of claim 11,
the executing comprising:
serializing the resource script according to the wire protocol supported by the host; and
sending the resource script serialized according to the wire protocol to a script processor on the host.

16. The method of claim 1, the wire protocol selected from a wire protocol set comprising:
a JavaScript Object Notation (JSON) wire protocol;
an Atom wire protocol; and
a Real Simple Syndication (RSS) wire protocol.

17. A system for generating a resource script applicable to a data set, the system comprising:
a design environment displaying component configured to display a design environment comprising elements respectively corresponding to an operation of a script language, the operations comprising:
at least one data set instruction affecting the data set, and
at least one flow control instruction configured to alter an execution flow of the resource script;
an operations set building component configured to, upon receiving a selection of at least one element in the design environment, add to the operations set the operation corresponding to the selected element; and
a resource script generating component configured to, upon receiving a request to generate the resource script for execution by a host:
among at least two wire protocols, selecting a wire protocol that is supported by the host; and
generate the resource script specifying respective operations of the operations set according to a verb of the wire protocol supported by the host.

18. The system of claim 17, further comprising: an operations set validating component configured to:
validate the operations of the operations set according to the script language;
upon validating the operations of the operations set, display a valid operations set indicator within the design environment; and
upon failing to validate at least one invalid operation of the operations set, display an invalid operation indicator for the at least one invalid operation of the operations set within the design environment.

19. The system of claim 17, further comprising: a resource script executing component configured to:
upon receiving input requesting executing of the resource script, present at least two execution contexts; and
upon receiving input choosing a selected execution context, execute the resource script on a script processor according to the selected execution context.

20. A method of generating a resource script applicable to a data set comprising at least one resource represented in a deployable computing environment hosted by a host and accessible according to a wire protocol, the method comprising:
displaying a design environment comprising elements respectively corresponding to an operation of a script language, the operations comprising:
at least one data set instruction affecting the data set, and
at least one flow control instruction configured to alter an execution flow of the resource script;
displaying the operations of an operations set within the design environment;
upon receiving input selecting an element, adding to the operations set an operation corresponding to the selected element;
upon receiving input relocating an operation in the operations set to a destination location, relocating the operation in the operations set;
upon receiving input selecting an operation in the operations set, displaying at least one property of the operation;
upon receiving input configuring at least one property of the operation, configuring the at least one property of the operation;
upon receiving input setting a breakpoint at an operation, associating a breakpoint with the operation;
validating the operations of the operations set according to the script language;
upon validating the operations of the operations set, displaying a valid operations set indicator within the design environment; and
upon failing to validate at least one invalid operation of the operations set, displaying an invalid operation indicator for the at least one invalid operation of the operations set within the design environment;
upon receiving input requesting generating of the resource script for execution by a host:
among at least two wire protocols, identifying a wire protocol that is supported by the host, and
generating the resource script specifying respective operations of the operations set according to a verb of the wire protocol that is supported by the host;
upon receiving input requesting execution of the resource script, presenting at least two execution contexts;
upon receiving input selecting a local execution context:
executing the resource script on a local script processor configured to:
for respective data set operations, issue the corresponding verb of the protocol to the host, and
for respective flow control operations, alter an execution flow of the resource script;
upon executing an operation associated with a breakpoint:
breaking the executing of the resource script, and
upon receiving input requesting resuming the executing of the resource script, resuming the executing of the resource script; and
upon receiving input selecting a property of an executing resource script, displaying the property of the executing resource script within the design environment; and
upon receiving input selecting a host execution context:
selecting a wire protocol that is supported by the host,
serializing the resource script according to the wire protocol, and
sending the resource script serialized according to the wire protocol to a script processor on the host.

* * * * *